(12) United States Patent
Jayaram

(10) Patent No.: US 12,495,319 B2
(45) Date of Patent: Dec. 9, 2025

(54) EVALUATING OPERATION OF A MONITORING SYSTEM ASSOCIATED WITH A WIRELESS TELECOMMUNICATION NETWORK

(71) Applicant: T-Mobile USA, Inc., Bellevue, WA (US)

(72) Inventor: Prabha Jayaram, Cranbury, NJ (US)

(73) Assignee: T-Mobile USA, Inc., Bellevue, WA (US)

( * ) Notice: Subject to any disclaimer, the term of this patent is extended or adjusted under 35 U.S.C. 154(b) by 540 days.

(21) Appl. No.: 17/967,846

(22) Filed: Oct. 17, 2022

(65) Prior Publication Data

US 2024/0129762 A1  Apr. 18, 2024

Related U.S. Application Data

(60) Provisional application No. 63/415,941, filed on Oct. 13, 2022.

(51) Int. Cl.
*H04W 24/08* (2009.01)
*H04L 41/0631* (2022.01)
(Continued)

(52) U.S. Cl.
CPC ......... *H04W 24/08* (2013.01); *H04L 41/0631* (2013.01); *H04L 41/069* (2013.01); *H04L 43/028* (2013.01); *H04W 24/02* (2013.01)

(58) Field of Classification Search
CPC .................................................. H04W 24/08
See application file for complete search history.

(56) References Cited

U.S. PATENT DOCUMENTS 7,050,432 B1  5/2006  Banavar et al.
7,120,685 B2  10/2006  Ullmann et al.
(Continued)

FOREIGN PATENT DOCUMENTS

CN  103973316 B  8/2017
CN  110083575 A  8/2019
(Continued)

*Primary Examiner* — Guang W Li
(74) *Attorney, Agent, or Firm* — Perkins Coie LLP

(57) ABSTRACT

A system generates metrics associated with a monitoring system of a wireless telecommunication network. The monitoring system analyzes importance of multiple messages generated by multiple components of the network and, based on the analysis, generates multiple alarms. The metrics include an event coherence metric, an event significance metric, an event knowledge metric, and an event quiescence metric. The event coherence metric indicates a number of the multiple alarms including sufficient information to aid in issue resolution. The event significance metric indicates a number of the multiple alarms resulting in an issue ticket creation. The event knowledge metric indicates a number of the multiple alarms including documentation associated with the alarm. The event quiescence metric indicates a number of the multiple alarms that have at most a predetermined number of alarms generated per issue. The system generates a report including the event coherence metric, significance metric, knowledge metric, and quiescence metric.

17 Claims, 10 Drawing Sheets

(51) Int. Cl.
*H04L 41/069* (2022.01)
*H04L 43/028* (2022.01)
*H04W 24/02* (2009.01)

(56) References Cited

U.S. PATENT DOCUMENTS

| | | | |
|---|---|---|---|
| 7,152,180 | B2 | 12/2006 | Shoaib et al. |
| 7,418,462 | B2 | 8/2008 | Lomet et al. |
| 7,448,039 | B2 | 11/2008 | Green et al. |
| 7,526,550 | B2 | 4/2009 | Frey et al. |
| 7,558,828 | B1 | 7/2009 | Panzer |
| 7,653,633 | B2 | 1/2010 | Villella et al. |
| 7,664,249 | B2 | 2/2010 | Horvitz et al. |
| 7,721,266 | B2 | 5/2010 | Frey et al. |
| 7,844,999 | B1 | 11/2010 | Aguilar-macias et al. |
| 7,912,938 | B2 | 3/2011 | Sayal et al. |
| 8,090,759 | B2 | 1/2012 | Parkinson et al. |
| 8,306,967 | B2 | 11/2012 | Galitsky et al. |
| 8,332,502 | B1 * | 12/2012 | Neuhaus ............ H04L 41/0686 709/224 |
| 8,380,859 | B2 | 2/2013 | Chaturvedi et al. |
| 8,499,240 | B2 | 7/2013 | Richstein |
| 8,601,589 | B2 | 12/2013 | Blagsvedt et al. |
| 9,547,638 | B2 | 1/2017 | Studer et al. |
| 9,639,434 | B2 * | 5/2017 | Chow ................. G06F 11/1471 |
| 9,742,624 | B2 | 8/2017 | Hanckel et al. |
| 9,798,607 | B1 | 10/2017 | Kulkarni et al. |
| 9,852,031 | B2 | 12/2017 | Mizutani et al. |
| 9,923,856 | B2 | 3/2018 | Seigel et al. |
| 10,015,067 | B2 | 7/2018 | Khan et al. |
| 10,142,204 | B2 * | 11/2018 | Nickolov ............ H04L 41/0869 |
| 10,353,756 | B2 | 7/2019 | Yoon et al. |
| 10,452,465 | B2 * | 10/2019 | Handa ................ G06F 11/0778 |
| 10,528,404 | B2 | 1/2020 | Chen et al. |
| 10,530,640 | B2 | 1/2020 | Alon et al. |
| 10,616,781 | B2 | 4/2020 | Mitchell et al. |
| 10,756,947 | B2 | 8/2020 | Hanckel |
| 10,931,511 | B2 | 2/2021 | Nucci et al. |
| 10,977,293 | B2 * | 4/2021 | Cai .................... G06F 16/3329 |
| 11,042,525 | B2 | 6/2021 | Das et al. |
| 11,093,378 | B2 * | 8/2021 | Balasubramanian ........................ G06F 11/3495 |
| 11,132,461 | B2 * | 9/2021 | Swafford ............ G06F 21/577 |
| 11,138,168 | B2 * | 10/2021 | Purushothaman .. H04L 43/0823 |
| 11,301,314 | B2 * | 4/2022 | Basu .................... G06F 11/079 |
| 11,301,363 | B2 | 4/2022 | Malleni |
| 11,516,069 | B1 * | 11/2022 | Satish ................... H04L 43/067 |
| 11,595,288 | B2 | 2/2023 | Nguyen et al. |
| 11,853,294 | B2 * | 12/2023 | Beedgen ............. G06F 16/2228 |
| 11,893,010 | B1 * | 2/2024 | Neels .................... G06F 16/245 |
| 11,921,603 | B2 | 3/2024 | Bansal et al. |
| 11,973,804 | B2 | 4/2024 | Raleigh et al. |
| 12,141,137 | B1 * | 11/2024 | Arora ................. G06F 16/2455 |
| 12,271,867 | B1 * | 4/2025 | Olmstead ............. G06Q 10/20 |
| 2006/0256012 | A1 | 11/2006 | Fok et al. |
| 2007/0185967 | A1 | 8/2007 | Hayes |
| 2010/0145978 | A1 | 6/2010 | Anashkin et al. |
| 2012/0150969 | A1 | 6/2012 | Reed et al. |
| 2012/0246303 | A1 | 9/2012 | Petersen et al. |
| 2014/0321262 | A1 * | 10/2014 | Biondi ................... H04L 41/06 370/242 |
| 2014/0324862 | A1 * | 10/2014 | Bingham .............. G06F 11/323 707/736 |
| 2015/0207709 | A1 * | 7/2015 | Hanckel ............. H04L 41/0618 709/224 |
| 2016/0301561 | A1 | 10/2016 | Petersen et al. |
| 2018/0091404 | A1 | 3/2018 | Galkin et al. |
| 2018/0285432 | A1 * | 10/2018 | Das ........................ G06F 16/955 |
| 2018/0285750 | A1 * | 10/2018 | Purushothaman .... H04L 41/149 |
| 2018/0287855 | A1 * | 10/2018 | Paramaguru .......... H04L 41/069 |
| 2019/0138725 | A1 * | 5/2019 | Gupta ..................... G06F 9/485 |
| 2019/0379577 | A1 * | 12/2019 | Tiwari ................. H04L 41/065 |
| 2020/0204434 | A1 * | 6/2020 | Nitsch ................ G06F 11/0772 |
| 2020/0327037 | A1 * | 10/2020 | Toal .................... G06F 11/3616 |
| 2021/0081837 | A1 * | 3/2021 | Polleri .................... G06N 5/022 |
| 2021/0389997 | A1 * | 12/2021 | Ibrahim .................. G06F 21/57 |
| 2021/0399972 | A1 * | 12/2021 | Nguyen .................. H04L 43/06 |
| 2022/0012143 | A1 | 1/2022 | Meeran et al. |
| 2022/0036177 | A1 | 2/2022 | Sriharsha et al. |
| 2022/0066998 | A1 | 3/2022 | Jha et al. |
| 2022/0121507 | A1 | 4/2022 | Jha et al. |
| 2022/0131766 | A1 * | 4/2022 | Bais ........................ H04L 41/16 |
| 2022/0158889 | A1 | 5/2022 | Jha et al. |
| 2022/0247784 | A1 * | 8/2022 | Satish ................. H04L 63/0281 |
| 2023/0004458 | A1 * | 1/2023 | Stewart ............... G06F 11/0709 |
| 2023/0171614 | A1 * | 6/2023 | Huang ................ H04L 43/0882 370/252 |
| 2023/0259436 | A1 * | 8/2023 | Meeran ............... G06F 11/3006 714/37 |
| 2023/0315603 | A1 * | 10/2023 | Pham ................... H04L 67/535 707/600 |
| 2024/0129762 | A1 | 4/2024 | Jayaram |
| 2025/0117758 | A1 * | 4/2025 | Schnitt ................. G06N 3/045 |
| 2025/0220447 | A1 | 7/2025 | Uelk et al. |

FOREIGN PATENT DOCUMENTS

| | | |
|---|---|---|
| CN | 110191097 A | 8/2019 |
| CN | 103975615 B | 9/2019 |
| CN | 111258971 A | 6/2020 |
| CN | 107992538 B | 10/2021 |
| CN | 113556254 A | 10/2021 |
| CN | 113872792 A | 12/2021 |
| DE | 202016008885 U1 | 5/2020 |
| EP | 1012748 A1 | 6/2000 |
| EP | 1856934 A2 | 11/2007 |
| EP | 1701265 B1 | 3/2011 |
| EP | 2553890 A1 | 2/2013 |
| EP | 2946332 A1 | 11/2015 |
| EP | 2984785 A2 | 2/2016 |
| EP | 3011430 A1 | 4/2016 |
| EP | 3138227 A1 | 3/2017 |
| EP | 3665570 A1 | 6/2020 |
| JP | 4897611 B2 | 1/2012 |
| JP | 2014106851 A | 6/2014 |
| JP | 5730407 B2 | 4/2015 |
| JP | 2016220213 A | 12/2016 |
| JP | 2018529148 A | 10/2018 |
| KR | 100228401 B1 | 11/1999 |
| KR | 20040107067 A | 12/2004 |
| KR | 101870383 B1 | 6/2018 |
| WO | 2008109707 A1 | 9/2008 |
| WO | 2014153010 A2 | 9/2014 |
| WO | 2016132717 A1 | 8/2016 |
| WO | 2017131791 A1 | 8/2017 |
| WO | 2017139666 A1 | 8/2017 |
| WO | 2018018688 A1 | 2/2018 |
| WO | 2018111272 A1 | 6/2018 |
| WO | 2019060326 A1 | 3/2019 |
| WO | 2020190612 A1 | 9/2020 |
| WO | 2020228289 A1 | 11/2020 |
| WO | 2020258290 A1 | 12/2020 |

* cited by examiner

*FIG. 7*

EVALUATING OPERATION OF A MONITORING SYSTEM ASSOCIATED WITH A WIRELESS TELECOMMUNICATION NETWORK

CROSS-REFERENCE TO RELATED APPLICATIONS

This application claims the benefit of U.S. Provisional Patent Application No. 63/415,941, filed Oct. 13, 2022, entitled MONITORING OPERATION OF MULTIPLE COMPONENTS ASSOCIATED WITH A WIRELESS TELECOMMUNICATION NETWORK, which is hereby incorporated by reference in its entirety.

BACKGROUND

Wireless telecommunication networks are complex systems including multiple components, each of which continuously generates voluminous messages regarding the operational status of the components. To effectively determine the status of the wireless telecommunication network, a system is needed to monitor the voluminous messages. In addition, the monitoring system itself can experience issues and may need to be fine-tuned.

BRIEF DESCRIPTION OF THE DRAWINGS

Detailed descriptions of implementations of the present invention will be described and explained through the use of the accompanying drawings.

FIG. 7 shows metrics used to evaluate operation of a monitoring system associated with the network.

Figure 1:
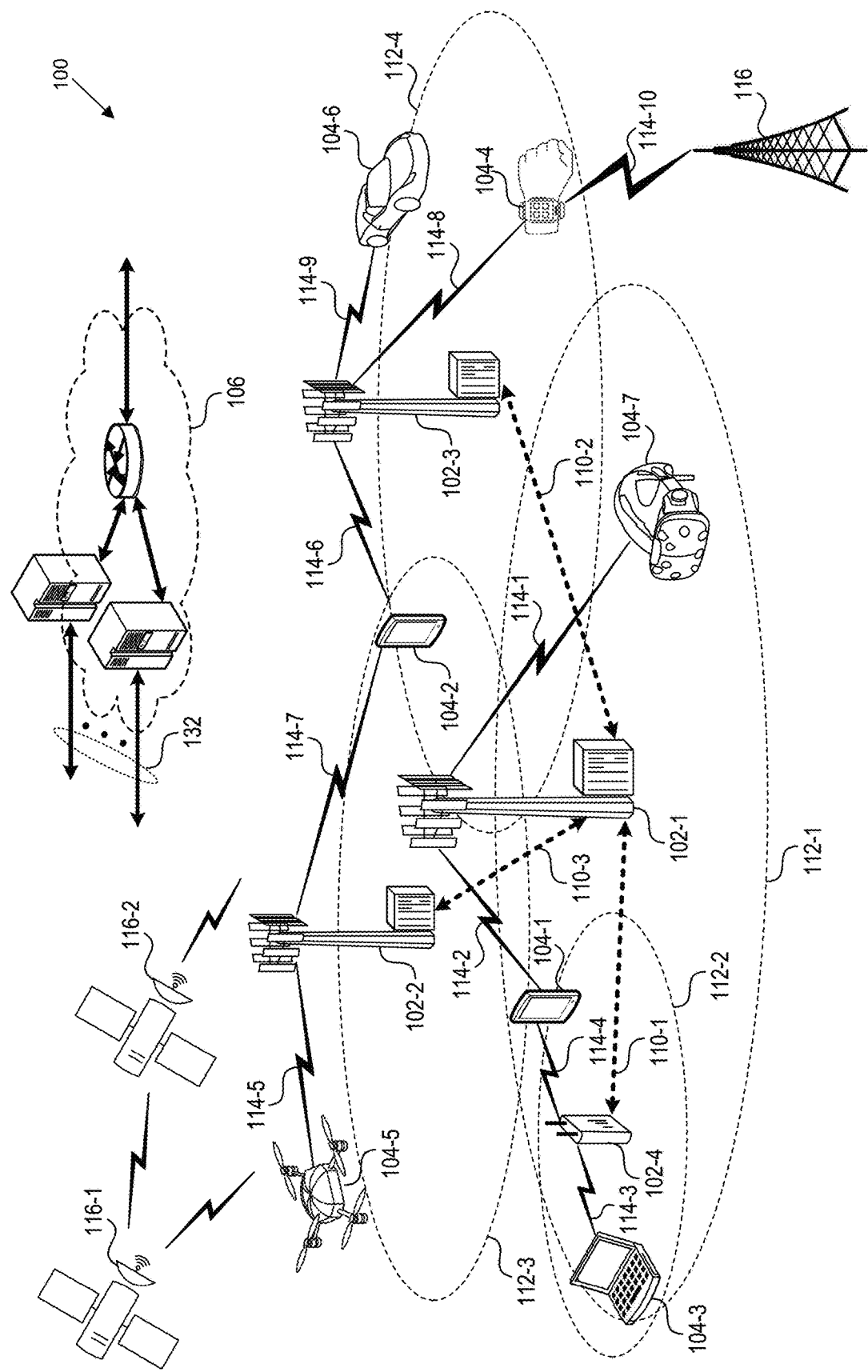
FIG. 1 is a block diagram that illustrates a wireless telecommunication network in which aspects of the disclosed technology are incorporated.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed here is an embodiment of a system and method to monitor operation of multiple components associated with a wireless telecommunication network. The system receives multiple logs from the multiple components associated with the wireless telecommunication network. The multiple components can include a process, such as a UNIX process, a piece of hardware, a licensing server, etc. The multiple logs indicate a state associated with the multiple components. The multiple logs can include a log A generated by a component A among the multiple components and a log B generated by a component B among the multiple components. The log can indicate a start of operation and/or an end of operation of the component.

The system can filter the multiple logs received based on importance associated with each log among the multiple logs to obtain multiple filtered logs. The importance of a log can be based on determining whether the log indicates routine activity or whether the log indicates an error with the network. The multiple filtered logs can include log A. The system can obtain a connectivity associated with the component A generating the log A, where the connectivity indicates that the component B associated with the wireless telecommunication network is configured to communicate with the component A. Connectivity can include node hierarchy, connectivity topology, and service topology. The system correlates the log A and the log B based on the connectivity, and based on the correlation between the first and log Bs, the system can automatically create an alarm representing both log A and B, thereby reducing a number of alarms generated from the multiple filtered logs.

In addition, disclosed here is an embodiment of a system and method to evaluate operation of a monitoring system associated with a wireless telecommunication network. The system generates multiple metrics associated with the monitoring system of the wireless telecommunication network. The monitoring system can analyze importance of multiple logs generated by multiple components associated with the wireless telecommunication network and, based on the analysis, generate multiple alarms. The multiple metrics can include an event coherence metric, an event significance metric, an event knowledge metric, and an event quiescence metric.

The event coherence metric indicates a number of the multiple alarms including sufficient information to aid in issue resolution. The event significance metric indicates a number of the multiple alarms resulting in an issue ticket creation. The system can pass the alarms to an expert team, and if the alarms are deemed to be duplicates of already existing alarms, the expert team does not create an issue ticket. However, if the generated alarm is novel, the expert team can create an issue ticket.

The event knowledge metric indicates a number of the multiple alarms including documentation associated with the alarms. The event quiescence metric indicates a number of the multiple alarms that have a single alarm generated per issue. The system can generate a report including the event coherence metric, the event significance metric, the event knowledge metric, and the event quiescence metric.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (VVWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QoS) requirements and multi-terabits per second data transmission in the era of 6G and beyond, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

In 5G Core Network Functions

Figure 2:
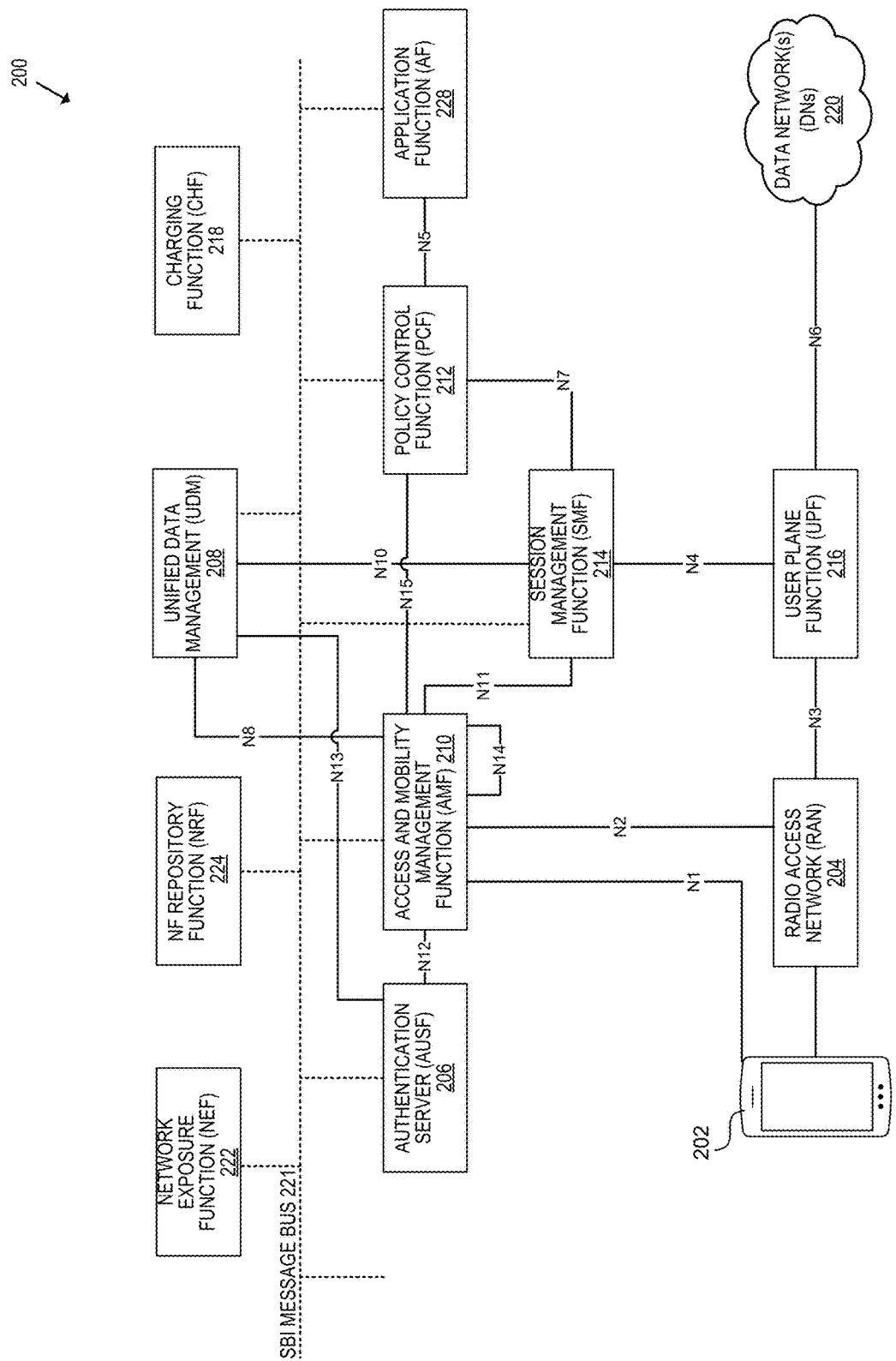
FIG. 2 is a block diagram that illustrates an architecture including 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226 (not shown), and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, and service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), providing authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes network slice selection, which is regulated by the NSSF 226.

Figure 3:
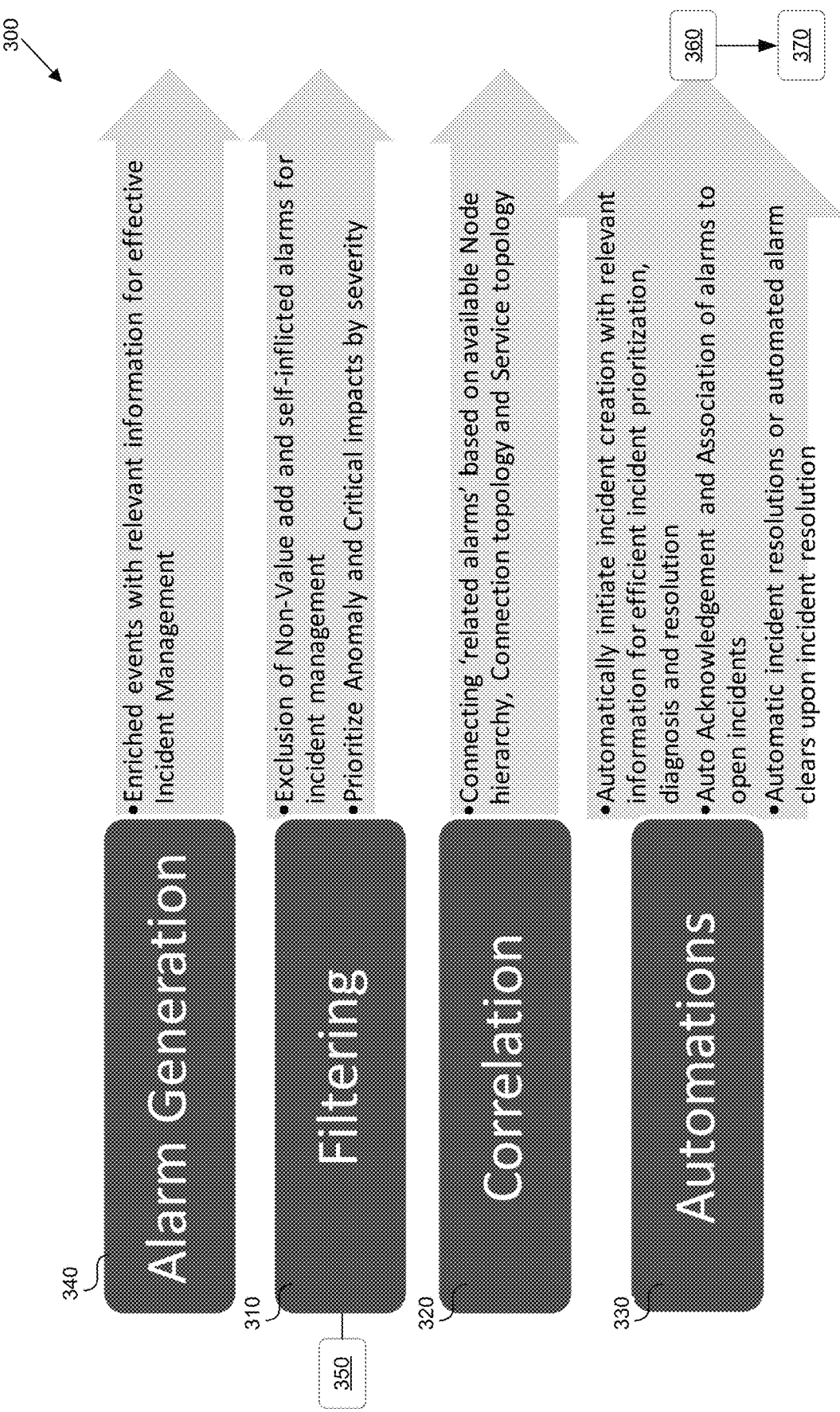
FIG. 3 shows modules of a system to monitor operation of multiple components associated with the wireless telecommunication network.

Monitoring Operation of Multiple Components Associated with a Wireless Telecommunication Network FIG. 3 shows modules of a system 300 to monitor operation of multiple components associated with the wireless telecommunication network 100 in FIG. 1. The wireless telecommunication network 100 can be a 2G, 3G, 4G, 5G or a 6G network. The system 300 can monitor network 100 operations, retail stores, cell sites, etc. The components associated with the wireless telecommunication network 100 can be the components shown in FIGS. 1 and 2. The components can include a piece of hardware such as a router, a software component such as a Unix process, or a licensing process. Each component can send a message, such as a log, to the system 300. For example, a license may have expired, and the licensing process can send an error message to the system 300. After the licensing process sends an error message an alarm is raised to a network operations team. The network operations team can create a ticket describing an issue with the network 100. The ticket is used to contact the software or hardware platform owners to identify and initiate the license renewal process. This may involve contacting a vendor for license key. The key generated by the vendor can show various pieces of information, such as product, customer and version.

The system 300 can include a filtering module 310, a correlation module 320, an automation module 330, and an alarm generation module 340. The filtering module 310 can receive multiple messages 350, and can analyze the content of the multiple messages to determine which messages indicate routine activity and which messages indicate an issue with the network 100.

For example, messages that indicate routine activity can be messages indicating that the component has started an operation and/or that the component has stopped the operation. Messages that are important can include detection of an error message, or detection that the component has started an operation but has never ceased the operation. Lack of a message indicating end-of-operation can indicate that the component is in an infinite loop.

Performance based alarms, referred as key performance index (KPI) alarms, are often built without a clear indication of acceptable measures. For example, the system knows when a measurement has breached a threshold and requires operational support but there is no clear implementation to indicate restoration of service and acceptable/normal measures below the threshold. In a more specific example, ECSCF_SIP_KPI is a performance monitor to detect Anomalies on node X for a KPI that is set to generate an alarm per host if there are more than five failures in a 15 minute window. Many KPIs, like ECSCF_SIP_KPI, do not clear when the condition has subsided. Lack of a message indicating end-of-KPI breach is problematic.

The filtering module 310 can discard the messages that are not important and indicate only routine activity. The filtering module 310 can take the filtered messages and prioritize them according to expected impact. The messages can include importance such critical, major, minor, informational or normal. The message importance can be changed and tuned with additional experience resolving the issues represented by messages.

The correlation module 320 can connect related alarms. To determine which alarms are related, the correlation module 320 can obtain component hierarchy, connection topology (e.g., connectivity of the components), and service topology. The component hierarchy can indicate which components encompass other subcomponents. Connection topology can indicate connectivity among the components, while service topology can indicate interdependence among services offered by the network 100. Based on the component hierarchy, connectivity, and service topology, the correlation module 320 can determine the connected components and correlate alarms.

For example, if component A and component B are connected through channel A, and channel A is experiencing an issue, the correlation module 320 can determine that components A and B are likely both experiencing an issue. If the correlation module 320 receives error messages from both component A and component B, the correlation module can determine that the error messages are correlated.

The automation module 330 can generate an alarm 360 including prioritization information from the filtering module 310, as well as diagnosis and resolution of the issue. The automation module 330 can generate a single alarm 360 for error messages from both components A and B, based on the correlation generated by the correlation module 320. As a result, the automation module 330 can avoid creating duplicate alarms 360. The automation module 330 can automatically clear the alarm 360 once the issue has been resolved.

The alarm generation module 340 can include additional information in the alarm 360 such as documentation associated with the component generating the alarm, and/or prior resolutions to similar alarms. The alarm generation module 340 can send the alarm 360 to an appropriate expert team that has experience in resolving the issue. The expert team can analyze the alarm 360, and if the alarm 360 indicates an issue that needs to be fixed, the team can create an issue ticket 370. The system 300 can provide a dashboard of the pending alarms 360 and resolved alarms.

Figure 4:
FIG. 4 shows a system to add and remove components to the monitoring system.

FIG. 4 shows a system 400 to add components to and remove components from the monitoring system 300 in FIG. 3. In step 410, the system 400 including a bot and/or an artificial intelligence (AI) can interact with the user to add a new component to the system 300. The system 400 can engage in natural language interaction with the user to obtain information about the new component. The system 400 can detect whether the new component has already been added to the system 300. If the new component has already been added to the system, the system 400 does not duplicate the components.

The system 400 can obtain the requirements indicating a functionality of the new component. The system 400 can receive a sample log from the component. Based on the requirements and the sample log, the system 400 can determine messages that are outside of the desired functionality and that should lead to alarm generation. The system 400 can obtain the necessary information about the new component including an IP address, a sample log, a sample alarm, and/or a password for the new component.

An alarm is a notification configured to invoke appropriate operational response to restore impacted services. A log is an informational documentation of an activity used in audit and review. A log is generated routinely in the operation of all devices, applications, servers etc. A log is used for trouble shooting and for AI/ML. Alarms and logs are generated by every network device, application, API etc. They are the operational footprints of the normal performance of any network device or software application.

The system 400 can also check whether documentation associated with the new component is provided. If there is no documentation, the system 400 can request the documentation. The system 300 can include the documentation when the alarm associated with the new component is generated, thus aiding in resolution of the issue.

In step 420, the system 400 can remove a component from the monitoring system 300. Further, the system 400 can disable any alarms associated with the removed component.

In step 430, the system 400 can associate the alarm 360 in FIG. 3 to an open issue ticket 370 in FIG. 3, acknowledge the alarm, and/or clear the alarm once the issue has been resolved.

Figure 5:
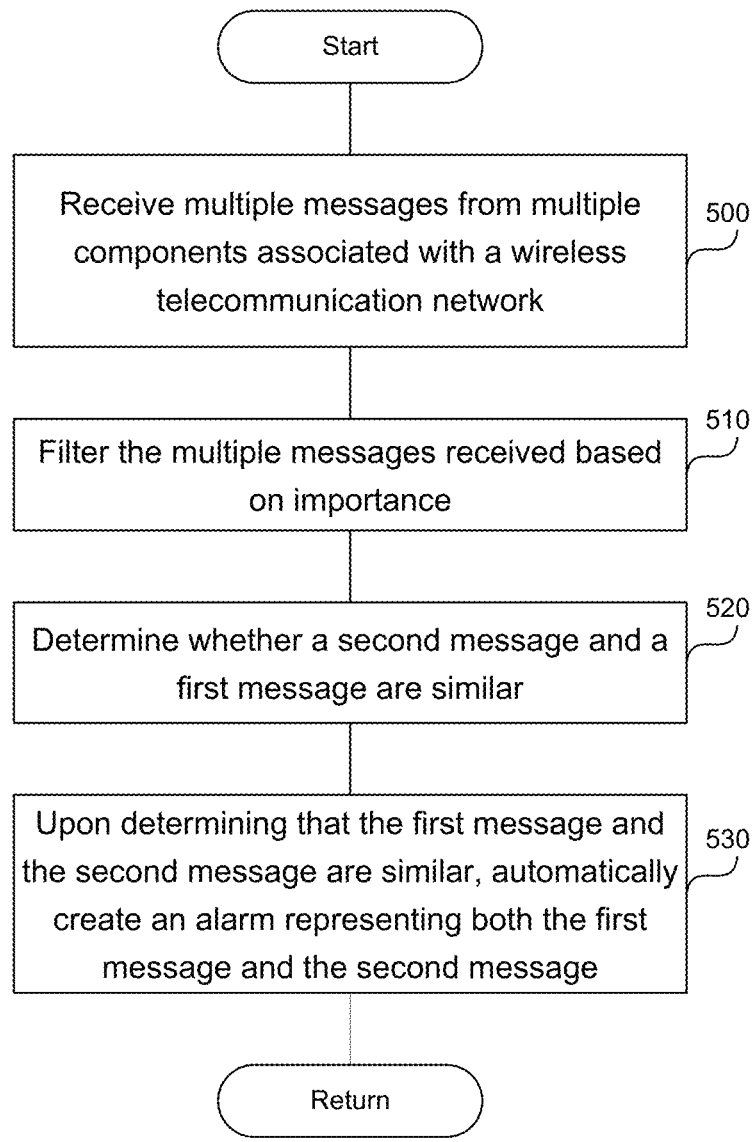
FIG. 5 is a flowchart of steps to monitor operation of multiple components associated with a wireless telecommunication network.

FIG. 5 is a flowchart of steps to monitor operation of multiple components associated with a wireless telecommunication network. In step 500, a hardware or software processor executing instructions described in this application can receive multiple messages from the multiple components associated with the wireless telecommunication network. The multiple components can include a process associated with the wireless telecommunication network or a piece of hardware associated with the wireless telecommunication network. The multiple messages can indicate a state associated with the multiple components associated with the wireless telecommunication network. The multiple messages can indicate an error associated with the component, a warning associated with the component, start of operation, end of operation, etc. A message can be a log associated with the component. The multiple messages can include a first message generated by a first component among the multiple components and a second message generated by a second component among the multiple components.

In step 510, the processor can filter the multiple messages received based on importance associated with each message among the multiple messages to obtain multiple filtered messages. The importance of a message can be based on determining whether the message indicates routine activity or whether the message indicates an error with the network.

In step 520, the processor can determine whether the first message and the second message are similar. The processor can obtain a connectivity associated with the first component generating the first message, where the connectivity can indicate that the second component associated with the wireless telecommunication network is configured to communicate with the first component. Connectivity can include node hierarchy, connections topology, and/or service topology. The processor can correlate the first message and the second message based on the connectivity.

In step 530, upon determining that the first message and the second message are similar, e.g., based on a correlation between the first message and the second message, the processor can automatically create an alarm representing both the first message and the second message, thereby reducing a number of alarms generated from the multiple filtered messages.

To filter the multiple messages received, the processor can exclude non-value-adding and/or self-inflicted messages. The processor can prioritize anomaly and importance of a message by severity. The processor can determine whether the first message is an informative message. The informative message can include a notification that a component among the multiple components has started an operation. The processor can determine whether, after a predetermined period of time, a second message is received, where the second message includes a notification that the component has stopped the operation. The waiting period can depend on the component sending the message. The waiting period can be several seconds, minutes, hours, and/or days. Upon determining that the second message was not received, the processor can include an indication among the multiple filtered messages that the second message was not received, and that the component may be experiencing an issue.

The processor can create a prioritization associated with the multiple filtered messages based on importance associated with the multiple filtered messages. The processor can obtain documentation associated with the first message and the second message. The processor can include the prioritization and documentation in the alarm. For example, the prioritization can vary between P1 and P8. P1 is the highest prioritization and indicates a crippling failure of one or more key business and network services that are highly likely customer impacting.

To filter the multiple messages received, the processor can determine whether the message is an informative message, where the informative message includes a notification that a component among the multiple components has started operation. Upon determining that the message is the informative message, the processor can exclude the message from the multiple messages.

The processor can add new components to monitor by, for example, using bots or AI. The processor can receive an indication of a new component added to the wireless telecommunication network. The indication can include at least three of: an IP address, a connectivity associated with the new component, a sample alarm, a sample log, and a password. The processor can obtain requirements associated with the new component. Based on the requirements, the processor can automatically determine a sample alarm. The processor can add the new component to the multiple components.

To determine whether the first message and the second message are similar, the processor can use AI. The processor can receive a third message among the multiple messages, where the third message differs from the first message and the second message. The processor can use AI to determine whether the third message is similar to the first message and the second message. Upon determining that the third message is similar to the first message and the second message, the processor can correlate the first message, the second message, and the third message.

The processor can automatically discover a connectivity of a component. To automatically discover the connectivity associated with the first component, the processor can send a third message originating at the first component. The processor can determine a second multiplicity of components affected by the third message. The processor can include the second multiplicity of components in the connectivity associated with the first component. The processor can use Simple Network Management Protocol (SNMP) Discovery to detect IP neighbor connectivity. SNMP is an Internet Standard protocol for collecting and organizing information about managed devices on IP networks. Non-SNMP devices use custom protocol that can be deciphered to "discover" neighbor configurations.

Figure 6:
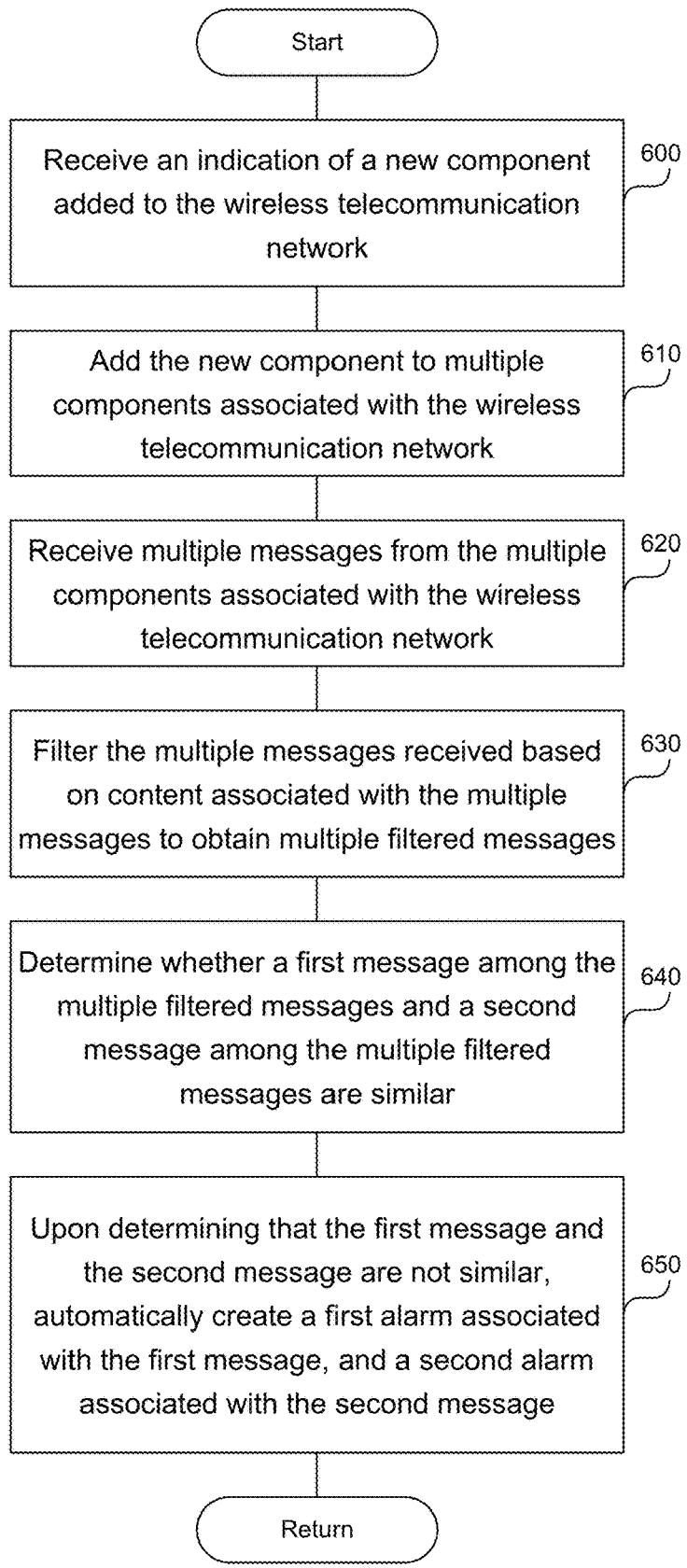
FIG. 6 is a flowchart of steps performed by a monitoring system.

FIG. 6 is a flowchart of steps performed by a monitoring system. In step 600, a processor and/or a receiving module can receive an indication of a new component added to a wireless telecommunication network, where the indication includes at least three of: an IP address, a connectivity associated with the new component, a sample alarm, a sample log, and a password.

In step 610, the processor and/or an integration module can add the new component to multiple components associated with a wireless telecommunication network. In step 620, the processor and/or a monitoring module can receive multiple messages from the multiple components associated with the wireless telecommunication network. A message among the multiple messages can be a log. The message can indicate start of operation, and/or end of operation. The multiple components can include a process associated with the wireless telecommunication network and a piece of hardware associated with the wireless telecommunication network. The multiple messages can indicate a state associated with the multiple components associated with the wireless telecommunication network. The multiple messages can include a first message generated by a first component among the multiple components and a second message generated by a second component among the multiple components.

In step 630, the processor and/or a filtering module can filter the multiple messages received based on content associated with the multiple messages to obtain multiple filtered messages. In step 640, the processor can determine whether a first message among the multiple filtered messages and a second message among the multiple filtered messages are similar.

In step 650, upon determining that the first message and the second message are not similar, the processor can automatically create a first alarm associated with the first message and a second alarm associated with the second message.

To determine whether the first message and the second message are similar, the processor can obtain a connectivity associated with the first component generating the first message. The processor can determine whether the connectivity associated with the first component indicates that the second component is coupled to the first component. The connectivity can include node hierarchy, connections topology, and/or service topology.

To filter the multiple messages received the processor can exclude of non-value adding self-inflicted alarms. Further, the processor can prioritize the alarms by critical impact and severity. The processor can determine whether the first message is an informative message, where the informative message can include a notification that a component among the multiple components has started an operation. The processor can determine whether, after a predetermined period of time, a second message is received, where the second message includes a notification that the component has stopped the operation. The predetermined amount of time can vary based on the component sending the message. Upon determining that the second message was not received, the processor can include an indication among the multiple filtered messages that the second message was not received. Subsequently, the processor can generate an alarm based on the included notification.

The processor can create a prioritization associated with the multiple filtered messages based on importance associated with the multiple filtered messages. The processor can obtain documentation associated with the first message and the second message. The processor can include the prioritization and documentation in the alarm.

To filter the multiple messages received, the processor can determine whether the message is an informative message, where the informative message includes a notification that a component among the multiple components has started operation. Upon determining that the message is the informative message, the processor can exclude the message from the multiple messages.

Figure 7:
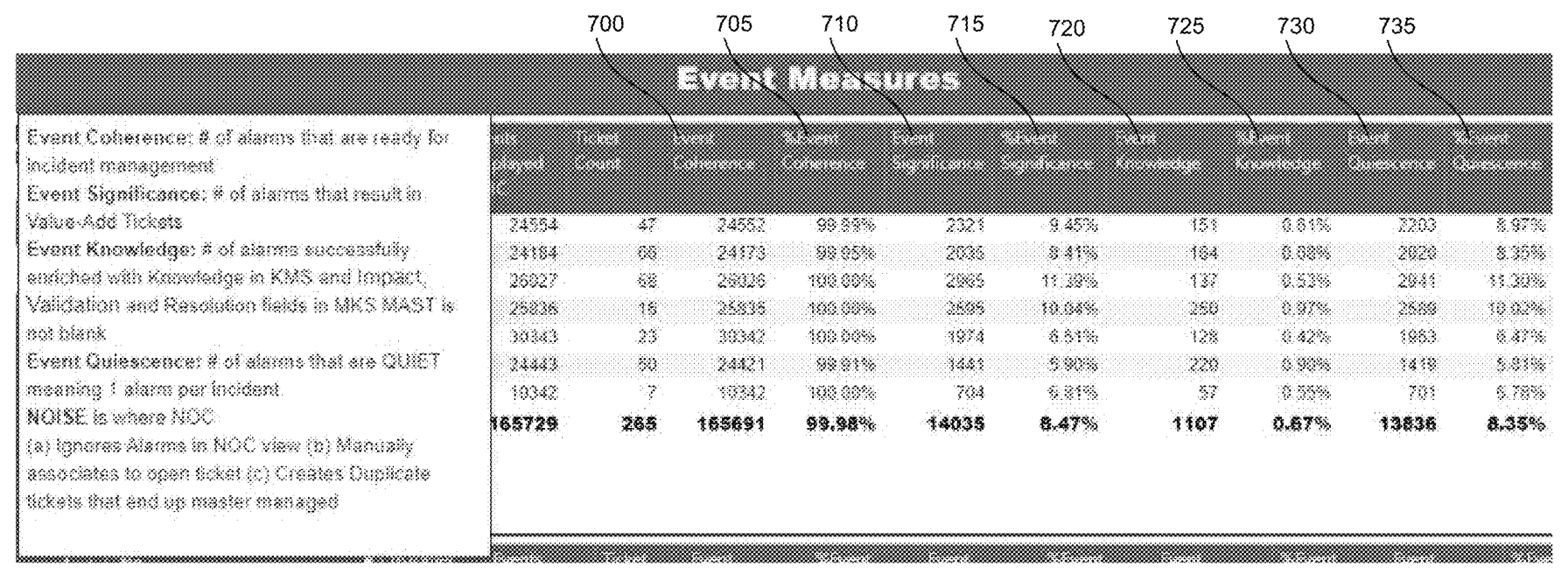

Evaluating Operation of a Monitoring System Associated with a Wireless Telecommunication Network FIG. 7 shows metrics 700, 710, 720, 730 used to evaluate operation of a monitoring system 300 in FIG. 3 associated with the network 100 in FIG. 1. The event coherence metric 700 indicates number of alarms that are ready to be passed to the expert team for issue management. To be ready to be passed to the expert team for information management, an alarm needs to identify the component or Configuration Item (CI) generating the alarm, the component's hierarchical parent connected CIs, operational state of alarmed CI, include descriptive content indicating the issue, a specific problem type, as well as include documentation associated with the component, and/or prior resolutions of similar alarms. The higher the number of the coherence metric 700, the better performing this monitoring system 300 is.

The event significance metric 710 indicates number of the multiple alarms resulting in an issue ticket creation. For example, if an alarm is a duplicate of a prior alarm, or related to the same issue as the prior alarm, the expert team can spend the resources to analyze the alarm, but the team does not create the issue ticket. Consequently, the generated alarms should not be duplicates of already existing alarms. The higher the number of the significance metric 710, the better performing the monitoring system 300 is.

The event knowledge metric 720 indicates number of the multiple alarms enriched with information, e.g., knowledge, associated with the alarms. Information associated with the alarms can include documentation associated with the component generating each alarm, or resolutions of prior alarms similar to the current alarm. The higher the number of the event knowledge metric 720, the better performing the monitoring system 300 is.

The event quiescence metric 730 indicates number of the multiple alarms that have at most a predetermined number of alarms generated per issue, such as one alarm generated per issue. In other words, the event quiescence metric 730 indicates the number of alarms that do not have duplicates. The higher the number of the event quiescence metric 730, the better performing the monitoring system 300 is.

The metrics 700, 710, 720, 730 can be expressed as absolute numbers or as percentages 705, 715, 725, 735, respectively, as seen in FIG. 7. As seen in FIG. 7, the event coherence metric percentage 705 is 99.98%, which is a high number. Consequently, monitoring system 300 is performing well according to the event coherence metric 700.

The event significance metric percentage 715 is 8.47%, which is extremely low. Similarly, event knowledge metric percentage 725 and event quiescence metric percentage 735 are low, indicating that the monitoring system 300 is performing poorly according to those metrics. The processor can monitor the metrics 700, 710, 720, 730 over time, and can indicate whether the change in the metrics indicates positive improvement to the monitoring system 300, or negative improvement to the monitoring system.

For example, if the event knowledge metric 720 is low, the processor can require additional documentation and information associated with an alarm. For example, the system 400 in FIG. 4 can require documentation prior to adding a new component to the network 100. In another example, the processor can build the information associated with the alarm, thus increasing event knowledge metric 720, from previously resolved alarms similar to the current alarm.

The processor can add new metrics to the existing metric 700, 710, 720, 730. For example, a new metric can indicate how many issues occurred within the network 100 for which there was no generated alarm. In this case, the lower the number of issues without the alarm, the better the monitoring system 300 is performing.

Figure 8:
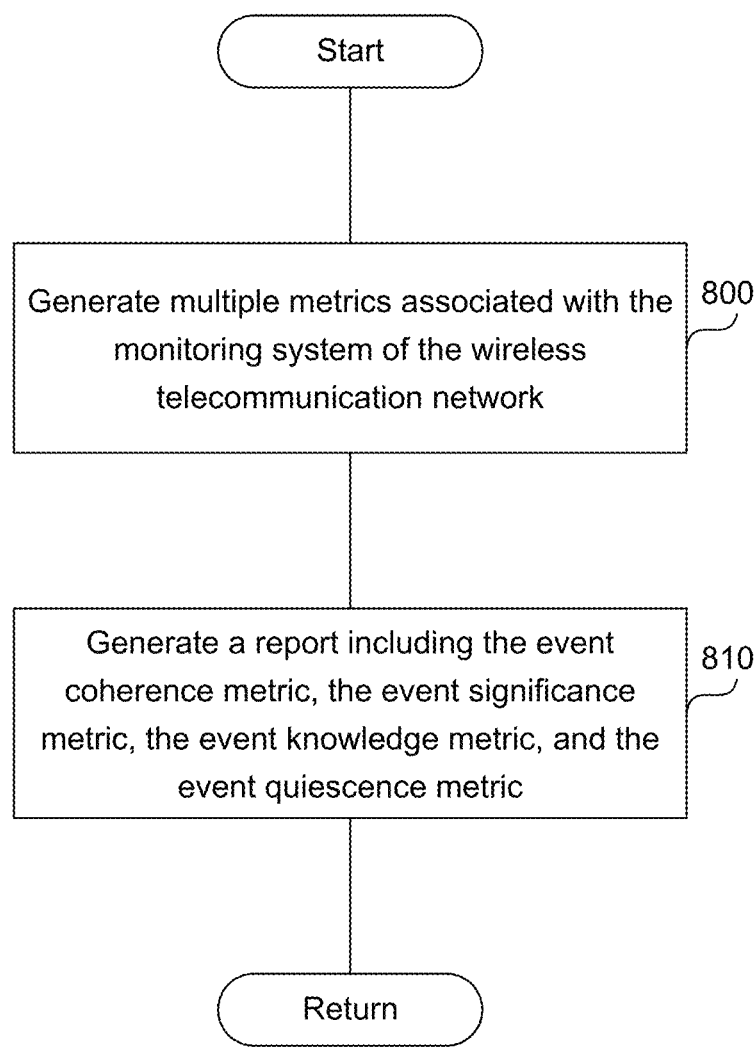
FIG. 8 is a flowchart of steps to evaluate operation of a monitoring system associated with a wireless telecommunication network.

FIG. 8 is a flowchart of steps to evaluate operation of a monitoring system associated with a wireless telecommunication network. In step 800, a processor can generate multiple metrics associated with the monitoring system of the wireless telecommunication network. The monitoring system can be configured to analyze importance of multiple messages generated by multiple components associated with the wireless telecommunication network and, based on the analysis, generate multiple alarms. The multiple metrics can include at least three of an event coherence metric, an event significance metric, an event knowledge metric, and an event quiescence metric.

The event coherence metric indicates number of the multiple alarms including sufficient information to aid in issue resolution. The event significance metric indicates number of the multiple alarms resulting in an issue ticket creation. the processor can pass the alarms to an expert team, such as a network operations center. If the expert team deems the past alarm to be a duplicate of an already existing alarm, no issue ticket is created. The event knowledge metric indicates number of the multiple alarms including documentation associated with the alarms. The event quiescence metric indicates number of the multiple alarms that have at most a predetermined number of alarms, e.g., one alarm, generated per issue.

In step 810, the processor can generate a report including the event coherence metric, the event significance metric, the event knowledge metric, and the event quiescence metric, and provide that report for review as shown in FIG. 7.

The processor can determine similar messages. The processor can receive the multiple messages including a first message generated by a first component among the multiple components and a second message generated by a second component among the multiple components. The processor can filter the multiple messages received based on content associated with a first message among the multiple messages to obtain multiple filtered messages including the first message. The content can indicate importance associated with the first message. The processor can obtain a connectivity associated with the first component generating the first message. The connectivity can indicate a second component associated with the wireless telecommunication network, where the second component is configured to communicate with the first component. The processor can correlate the first message and the second message based on the connectivity. Based on a correlation between the first message and the second message, the processor can automatically create an alarm representing both the first message and the second message, thereby reducing number of alarms generated from the multiple filtered messages.

The processor can ensure that certain requirements are met when adding a new component to the wireless or communication network, such as the necessary recommendation. The processor can receive an indication of a new component added to the wireless telecommunication network, where the indication includes at least two of: an IP address, a connectivity associated with the new component, and a sample log. The processor can determine whether the indication includes documentation associated with the new component. Upon determining that the indication does not include the documentation associated with the new component, the processor can send a request for the documentation. The processor can receive the documentation associated with the new component. Upon receiving the documentation, the processor can create an alarm associated with the new component. The processor can include at least a portion of the documentation in the alarm.

The processor can monitor trends among the multiple metrics. The processor can analyze trends associated with the multiple metrics by determining whether the event coherence metric, the event significance metric, the event knowledge metric, and the event quiescence metric are increasing. The processor can produce an indication of a positive trend when a metric among the multiple metrics is increasing.

The processor can build event knowledge from support documents and resolved issues. The processor can obtain documentation associated with a component among the multiple components generating the message. The processor can obtain a resolution to a prior alarm associated with the component. The processor can include the documentation and the resolution in the alarm.

The processor can adjust the multiple metrics, by adding or removing individual metrics based on how informative they are in respect to the performance of the monitoring system. For example, the processor can determine a new metric to add to the multiple metrics, where the new metric indicates number of issues for which the alarm was not generated. The lower the number associated with the new metric the better. The processor can add the new metric to the multiple metrics.

Figure 9:
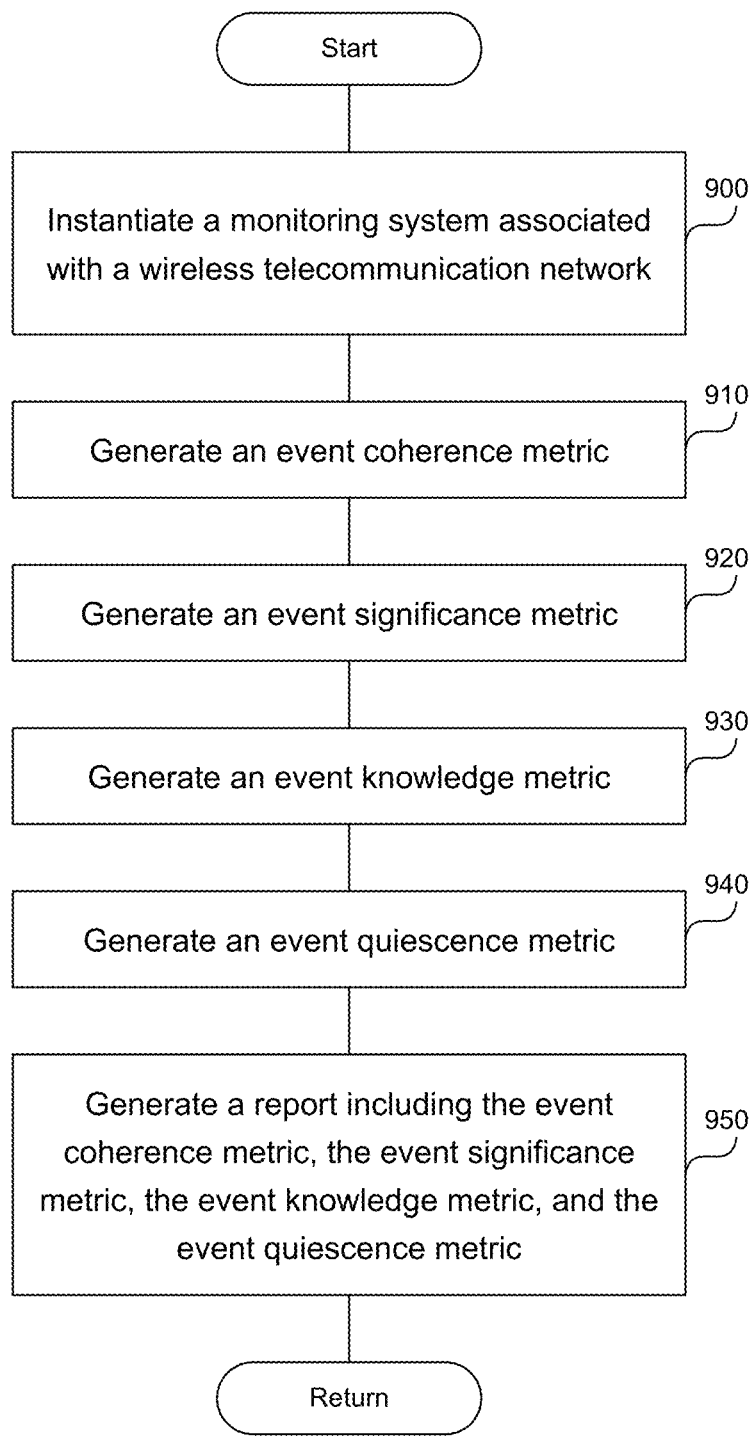
FIG. 9 is a flowchart of steps to generate metrics used in evaluating operation of a monitoring system associated with a wireless telecommunication network.

FIG. 9 is a flowchart of steps to generate metrics used in evaluating operation of a monitoring system associated with a wireless telecommunication network. In step 900, the processor can instantiate a monitoring system associated with the wireless telecommunication network. The monitoring system can be configured to analyze importance of multiple messages generated by multiple components associated with the wireless telecommunication network and, based on the analysis, generate multiple alarms.

In step 910, the processor and/or a genesis module associated with the monitoring system can generate the event coherence metric indicating number of the multiple alarms including sufficient information to aid in issue resolution. In step 920, the processor and/or the genesis module can generate the event significance metric indicating number of the multiple alarms resulting in an issue ticket creation. In step 930, the processor and/or the genesis module can generate the event knowledge metric indicating number of the multiple alarms including documentation associated with the alarms. In step 940, the processor and/or the genesis module can generate the event quiescence metric indicating number of the multiple alarms that have at most a predetermined number of alarms generated per issue. In step 950, the processor and/or the genesis module can generate a report including the event coherence metric, the event significance metric, the event knowledge metric, and the event quiescence metric. Further, the processor can perform additional steps described in this application.

Computer System

Figure 10:
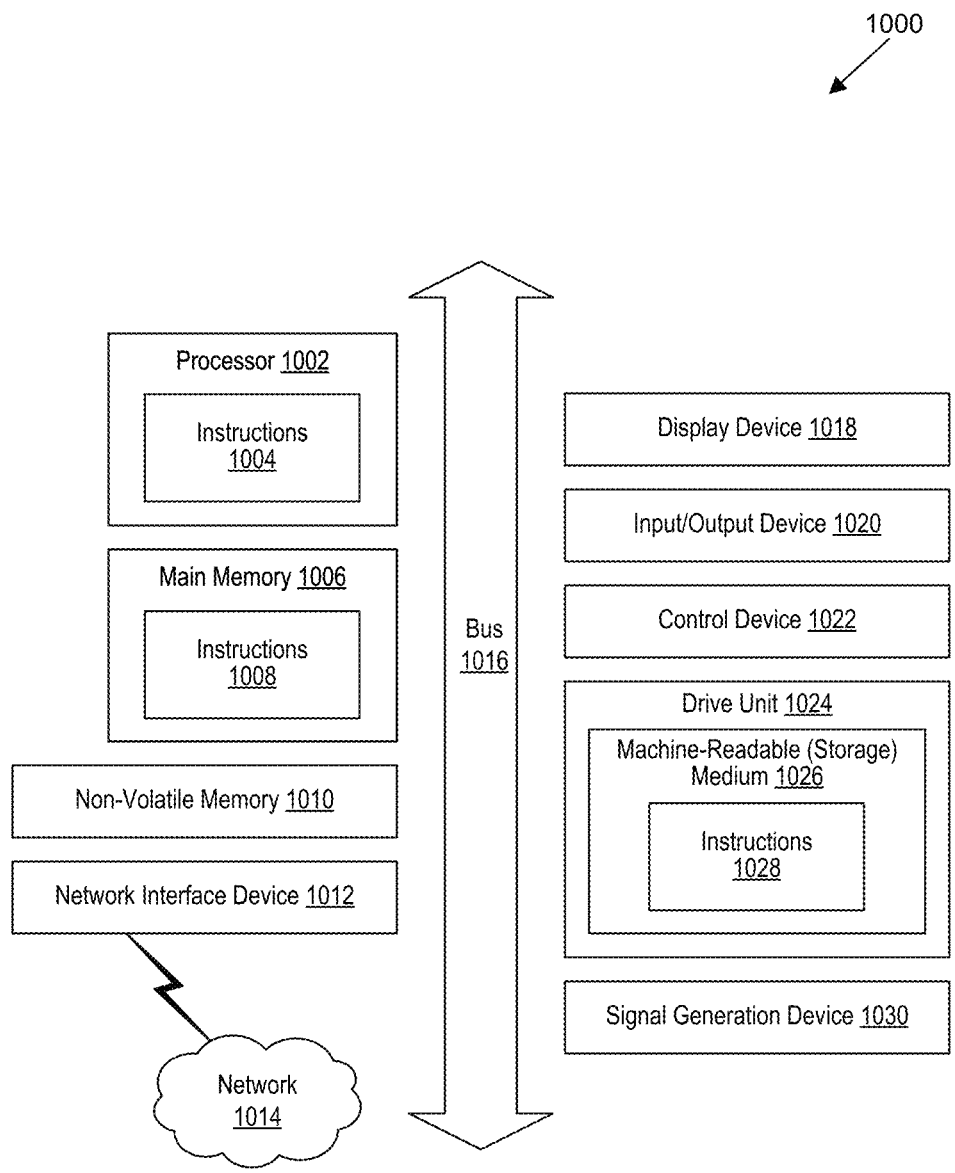
FIG. 10 is a block diagram that illustrates an example of a computer system in which at least some operations described herein can be implemented.

FIG. 10 is a block diagram that illustrates an example of a computer system 1000 in which at least some operations described herein can be implemented. As shown, the computer system 1000 can include: one or more processors 1002, main memory 1006, non-volatile memory 1010, a network interface device 1012, a video display device 1018, an input/output device 1020, a control device 1022 (e.g., keyboard and pointing device), a drive unit 1024 that includes a storage medium 1026, and a signal generation device 1030 that are communicatively connected to a bus 1016. The bus 1016 represents one or more physical buses and/or point-to-point connections that are connected by appropriate bridges, adapters, or controllers. Various common components (e.g., cache memory) are omitted from FIG. 10 for brevity. Instead, the computer system 1000 is intended to illustrate a hardware device on which components illustrated or described relative to the examples of the Figures and any other components described in this specification can be implemented.

The computer system 1000 can take any suitable physical form. For example, the computer system 1000 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 1000. In some implementations, the computer system 1000 can be an embedded computer system, a system-on-chip (SOC), a single-board computer system (SBC), or a distributed system such as a mesh of computer systems, or the computer system 1000 can include one or more cloud components in one or more networks. Where appropriate, one or more computer systems 1000 can perform operations in real-time, near real-time, or in batch mode.

The network interface device 1012 enables the computer system 1000 to mediate data in a network 1014 with an entity that is external to the computer system 1000 through any communication protocol supported by the computer system 1000 and the external entity. Examples of the network interface device 1012 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1006, non-volatile memory 1010, machine-readable medium 1026) can be local, remote, or distributed. Although shown as a single medium, the machine-readable medium 1026 can include multiple media (e.g., a centralized/distributed database and/or associated caches and servers) that store one or more sets of instructions 1028. The machine-readable (storage) medium 1026 can include any medium that is capable of storing, encoding, or carrying a set of instructions for execution by the computer system 1000. The machine-readable medium 1026 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 1010, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1004, 1008, 1028) set at various times in various memory and storage devices in computing device(s). When read and executed by the processor 1002, the instruction(s) cause the computer system 1000 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and, such references can mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

The invention claimed is:

1. At least one non-transitory computer-readable storage medium storing instructions to evaluate operation of a monitoring system associated with a wireless telecommunication network, which, when executed by at least one data processor of a system, cause the system to:
   generate multiple metrics associated with the monitoring system of the wireless telecommunication network,
      wherein the monitoring system is configured to analyze importance of multiple logs generated by multiple components associated with the wireless telecommunication network and, based on the analysis, generate multiple alarms,
      wherein the multiple metrics include an event coherence metric, an event significance metric, an event knowledge metric, and an event quiescence metric,
      wherein the event coherence metric indicates a number of the multiple alarms including information to aid in issue resolution,
      wherein the event significance metric indicates a number of the multiple alarms resulting in an issue ticket creation,
      wherein the event knowledge metric indicates a number of the multiple alarms including documentation associated with an alarm among the multiple alarms, and,
      wherein the event quiescence metric indicates a number of the multiple alarms that have at most a predetermined number of alarms generated per issue;
   receive an indication of a new component added to the wireless telecommunication network,
      wherein the indication includes at least two of: an Internet Protocol (IP) address, a connectivity associated with the new component, and a sample log;
   determine whether the indication includes documentation associated with the new component;
   upon determining that the indication does not include the documentation associated with the new component, send a request for the documentation; and
   generate a report including the event coherence metric, the event significance metric, the event knowledge metric, and the event quiescence metric.

2. The at least one non-transitory computer-readable storage medium of claim 1, further comprising instructions to:
   receive the multiple logs including a first log generated by a first component among the multiple components and a second log generated by a second component among the multiple components;
   filter the multiple logs received based on content associated with the first log among the multiple logs to obtain multiple filtered logs, wherein the content indicates importance associated with the first log, and, wherein the multiple filtered logs include the first log;

obtain a connectivity associated with the first component generating the first log, wherein the connectivity indicates the second component is configured to communicate with the first component;

correlate the first log and the second log based on the connectivity; and based on a correlation between the first log and the second log, automatically create an alarm representing both the first log and the second log, thereby reducing a number of alarms generated from the multiple filtered logs.

3. The at least one non-transitory computer-readable storage medium of claim 1, further comprising instructions to:

analyze trends associated with the multiple metrics by:
determining whether the event coherence metric, the event significance metric, the event knowledge metric, and the event quiescence metric are increasing; and produce an indication of a positive trend when a metric among the multiple metrics is increasing.

4. The at least one non-transitory computer-readable storage medium of claim 1, further comprising instructions to:

obtain documentation associated with a component among the multiple components generating a log among the multiple logs;

obtain a resolution to a prior alarm associated with the component; and include the documentation and the resolution in the alarm.

5. The at least one non-transitory computer-readable storage medium of claim 1, further comprising instructions to:

receive an indication of a new component added to the wireless telecommunication network,
wherein the indication includes at least two of: an Internet Protocol (IP) address, a connectivity associated with the new component, and a sample log;

determine whether the indication includes documentation associated with the new component;

upon determining that the indication does not include the documentation associated with the new component, send a request for the documentation;

receive the documentation associated with the new component;

create an alarm associated with the new component; and include at least a portion of the documentation in the alarm.

6. The at least one non-transitory computer-readable storage medium of claim 1, further comprising instructions to:

determine a new metric to add to the multiple metrics, wherein the new metric indicates a number of issues for which the alarm was not generated; and add the new metric to the multiple metrics.

7. A system comprising:
at least one hardware processor; and
at least one non-transitory memory storing instructions, which, when executed by the at least one hardware processor, cause the system to:
generate multiple metrics associated with a monitoring system of a wireless telecommunication network, wherein the monitoring system is configured to analyze importance of multiple messages generated by multiple components associated with the wireless telecommunication network and, based on the analysis, generate multiple alarms,
wherein the multiple metrics include at least three of an event coherence metric, an event significance metric, an event knowledge metric, and an event quiescence metric,
wherein the event coherence metric indicates a number of the multiple alarms including information to aid in issue resolution,
wherein the event significance metric indicates a number of the multiple alarms resulting in an issue ticket creation,
wherein the event knowledge metric indicates a number of the multiple alarms including documentation associated with an alarm among the multiple alarms,
wherein the event quiescence metric indicates a number of the multiple alarms that have at most a predetermined number of alarms generated per issue;

receive an indication of a new component added to the wireless telecommunication network,
wherein the indication includes at least two of: an Internet Protocol (IP) address, a connectivity associated with the new component, and a sample log;

determine whether the indication includes documentation associated with the new component;

upon determining that the indication does not include the documentation associated with the new component, send a request for the documentation; and generate a report including the event coherence metric, the event significance metric, the event knowledge metric, and the event quiescence metric.

8. The system of claim 7, further comprising instructions to:

receive the multiple messages including a first message generated by a first component among the multiple components and a second message generated by a second component among the multiple components;

filter the multiple messages received based on content associated with a first message among the multiple messages to obtain multiple filtered messages,
wherein the content indicates importance associated with the first message,
wherein the multiple filtered messages include the first message;

obtain a connectivity associated with the first component generating the first message,
wherein the connectivity indicates the second component is configured to communicate with the first component;

correlate the first message and the second message based on the connectivity;

based on a correlation between the first message and the second message, automatically create an alarm representing both the first message and the second message, thereby reducing a number of alarms generated from the multiple filtered messages.

9. The system of claim 7, further comprising instructions to:

analyze trends associated with the multiple metrics by:
determining whether the event coherence metric, the event significance metric, the event knowledge metric, and the event quiescence metric are increasing; and produce an indication of a positive trend when a metric among the multiple metrics is increasing.

10. The system of claim 7, further comprising instructions to:
obtain documentation associated with a component among the multiple components generating a message among the multiple messages;
obtain a resolution to a prior alarm associated with the component; and
include the documentation and the resolution in the alarm.

11. The system of claim 7, further comprising instructions to:
receive an indication of a new component added to the wireless telecommunication network,
wherein the indication includes at least two of: an Internet Protocol (IP) address, a connectivity associated with the new component, and a sample log;
determine whether the indication includes documentation associated with the new component;
upon determining that the indication does not include the documentation associated with the new component, send a request for the documentation;
receive the documentation associated with the new component;
create an alarm associated with the new component; and
include at least a portion of the documentation in the alarm.

12. The system of claim 7, further comprising instructions to:
determine a new metric to add to the multiple metrics,
wherein the new metric indicates a number of issues for which the alarm was not generated; and
add the new metric to the multiple metrics.

13. A system to generate multiple metrics associated with a monitoring system comprising:
at least one hardware processor; and
at least one non-transitory memory storing instructions, which, when executed by the at least one hardware processor, cause the system to:
instantiate the monitoring system associated with a wireless telecommunication network,
wherein the monitoring system is configured to analyze importance of multiple messages generated by multiple components associated with the wireless telecommunication network and, based on the analysis, generate multiple alarms; and
a genesis module associated with the monitoring system,
wherein the genesis module is configured to:
generate an event coherence metric indicating a number of the multiple alarms including information to aid in issue resolution;
generate an event significance metric indicating a number of the multiple alarms resulting in an issue ticket creation;
generate an event knowledge metric indicating a number of the multiple alarms including documentation associated with an alarm among the multiple alarms;
generate an event quiescence metric indicating a number of the multiple alarms that have at most a predetermined number of alarms generated per issue;
receive an indication of a new component added to the wireless telecommunication network,
wherein the indication includes at least two of: an Internet Protocol (IP) address, a connectivity associated with the new component, and a sample log;
determine whether the indication includes documentation associated with the new component;
upon determining that the indication does not include the documentation associated with the new component, send a request for the documentation; and
generate a report including the event coherence metric, the event significance metric, the event knowledge metric, and the event quiescence metric.

14. The system of claim 13, further comprising instructions to:
receive the multiple messages including a first message generated by a first component among the multiple components and a second message generated by a second component among the multiple components;
filter the multiple messages received based on content associated with a first message among the multiple messages to obtain multiple filtered messages,
wherein the content indicates importance associated with the first message,
wherein the multiple filtered messages include the first message;
obtain a connectivity associated with the first component generating the first message,
wherein the connectivity indicates the second component is configured to communicate with the first component;
correlate the first message and the second message based on the connectivity; and
based on a correlation between the first message and the second message, automatically create an alarm representing both the first message and the second message, thereby reducing a number of alarms generated from the multiple filtered messages.

15. The system of claim 13, further comprising instructions to:
analyze trends associated with multiple metrics including the event coherence metric, the event significance metric, the event knowledge metric, and the event quiescence metric, by:
determining whether the event coherence metric, the event significance metric, the event knowledge metric, and the event quiescence metric are increasing; and
produce an indication of a positive trend when a metric among the multiple metrics is increasing.

16. The system of claim 13, further comprising instructions to:
obtain documentation associated with a component among the multiple components generating a message among the multiple messages;
obtain a resolution to a prior alarm associated with the component; and
include the documentation and the resolution in the alarm.

17. The system of claim 13, further comprising instructions to:
receive an indication of a new component added to the wireless telecommunication network,
wherein the indication includes at least two of: an Internet Protocol (IP) address, a connectivity associated with the new component, and a sample log;
determine whether the indication includes documentation associated with the new component;
upon determining that the indication does not include the documentation associated with the new component, send a request for the documentation;
receive the documentation associated with the new component;
create the alarm associated with the new component; and include at least a portion of the documentation in the alarm.

\* \* \* \* \*